United States Patent [19]

Strock et al.

[11] Patent Number: 5,330,345
[45] Date of Patent: Jul. 19, 1994

[54] APPARATUS AND METHOD FOR CONTINUOUSLY WINDING A LENGTH OF MATERIAL INTO A HELICAL FORM

[75] Inventors: Christopher W. Strock, Yarmouth, Me.; Rachel E. Hefner, Troy, N.Y.; Shelly Petronis, Vernon Hills, Ill.; René M. Cooper, Ballston Spa, N.Y.

[73] Assignees: Sheridan Catheter Corp., Argyle; Rensselaer Polytechnic Institute, Troy, both of N.Y.

[21] Appl. No.: 914,145

[22] Filed: Jul. 16, 1992

[51] Int. Cl.⁵ .................. B65H 75/28; B29C 53/32
[52] U.S. Cl. ............................. 425/391; 72/142; 264/281; 425/321; 425/392; 425/445
[58] Field of Search ............... 425/319, 320, 321, 322, 425/384, 391, 392, 445; 72/135, 142, 242.2; 264/281, DIG. 40; 242/47.04, 47.05, 47.08, 47.09, 47.1

[56] References Cited

U.S. PATENT DOCUMENTS

| | | | |
|---|---|---|---|
| 2,450,324 | 9/1948 | Wilson et al. | 425/321 |
| 2,573,300 | 10/1951 | Beaumariage et al. | 425/322 |
| 2,589,411 | 3/1952 | Lorig | 242/47.07 |
| 2,601,269 | 6/1952 | Fisch | 264/281 |
| 3,454,695 | 7/1969 | Holmgren | 264/281 |
| 3,673,167 | 6/1972 | Ledoux et al. | 525/227 |
| 3,770,025 | 11/1973 | Hirschfelder et al. | 242/83 |
| 3,810,474 | 5/1974 | Cross | 128/207.15 |
| 3,914,102 | 10/1975 | Brown | 425/392 |
| 4,010,054 | 3/1977 | Bradt | 156/173 |
| 4,033,808 | 7/1977 | Petzetakis | 425/322 |
| 4,078,957 | 3/1978 | Bradt | 156/173 |
| 4,136,837 | 1/1979 | Fecker et al. | 242/47.01 |
| 4,157,235 | 6/1979 | Lagabe et al. | 425/325 |
| 4,211,741 | 7/1980 | Ostoich | 264/103 |
| 4,231,834 | 11/1980 | Gonzalez | 425/326.1 |
| 4,300,728 | 11/1981 | Andre et al. | 242/18 PW |
| 4,346,856 | 8/1982 | Paietta | 242/74 |
| 4,440,353 | 4/1984 | Shelton et al. | 242/47.01 |
| 4,509,968 | 4/1985 | Arditty et al. | 425/322 |
| 4,541,583 | 9/1985 | Forman et al. | 242/64 |
| 4,747,811 | 5/1988 | Sawafuji et al. | 474/135 |
| 4,749,137 | 6/1988 | Seagrave | 242/47.1 |
| 4,867,671 | 9/1989 | Nagayoshi et al. | 425/391 |
| 4,919,395 | 4/1990 | Ritter et al. | 266/103 |
| 4,929,167 | 5/1990 | Pepper | 425/325 |
| 9,398,876 | 4/1946 | Bailey | 264/288.4 |

FOREIGN PATENT DOCUMENTS

| | | | |
|---|---|---|---|
| 0011916 | 6/1980 | European Pat. Off. | 72/135 |
| 52-32978 | 3/1977 | Japan | 264/103 |

*Primary Examiner*—Jay H. Woo
*Assistant Examiner*—Robert B. Davis
*Attorney, Agent, or Firm*—Burns, Doane, Swecker & Mathis

[57] ABSTRACT

An apparatus for continuously winding a length of material into a helical form includes a frame structure and a plurality of rollers mounted on the frame structure. Each roller has a non-grooved surface with portions of a different diameter, a longitudinal axis and oppositely positioned first and second ends, and the plurality of rollers are arranged about a winder axis in a substantially circular fashion. The rollers are individually rotatably driven and the first and second ends of each roller are offset with respect to one another as viewed from one end of the respective roller along a line parallel to the winder axis and passing through the longitudinal axis of the respective roller at the one end of the respective roller. The method includes continuously feeding a length material onto a plurality of rollers that are arranged in a substantially cylindrical manner about a winder axis so that the outer surfaces of the rollers define a cylindrical winder surface about which the material is to be wound. The individual rollers are individually driven about respective axes that are nonparallel to the winder axis to thereby cause the material to be automatically wound in a helical manner about the winder surface and to continuously move along the length of the rollers.

16 Claims, 6 Drawing Sheets

APPARATUS AND METHOD FOR CONTINUOUSLY WINDING A LENGTH OF MATERIAL INTO A HELICAL FORM

FIELD OF THE INVENTION

The present invention pertains generally to a method and apparatus for helically winding a length of material. More particularly, the present invention relates to a method and apparatus for continuously winding a length of moldable material into a helical form.

BACKGROUND OF THE INVENTION

It is oftentimes useful and desirable to form tubing, such as plastic tubing, into a helical form. One type of apparatus known for winding the tubing into a helical form involves the use of a rotating and translating drum. The rotating and translating drum is operated by placing the hot extruded PVC tubing on the drum and then rotating and simultaneously axially translating the drum to cause the tubing to form a helical pattern around the drum. After the drum is filled, the tubing is cut and the drum is removed and replaced with an empty drum. The full drums are set aside for a period of time to cool and form the material in the helical form.

There are, however, a number of disadvantages that accompany the use of such a rotating and translating drum. For example, the apparatus does not permit the tubing to be continuously wound into a helical form. Quite the contrary, the winding operation must be interrupted rather frequently. The apparatus also does not include a suitable cooling arrangement that allows the tubing to be cooled. Also, the apparatus does not lend itself to the automated chopping or cutting of the tubing. Additionally, an operator is required for the drum changeover. Further, there is a significant amount of material waste between drums and at each end of the drum where the orientation of the tubing is not maintained. The net result, therefore, is that the use of such an apparatus causes a significant amount of waste as well as a sizable decrease in productivity.

SUMMARY OF THE INVENTION

The present invention provides a method and apparatus for continuously winding a length of material into a helical form. More particularly, the apparatus of the present invention includes a frame structure and a plurality of rollers mounted on the frame structure. The plurality of rollers are arranged about a winder axis in a substantially circular manner with each of the rollers having a longitudinal axis and oppositely positioned first and second ends. The apparatus further includes a driving mechanism for rotatably driving each of the plurality of rollers about their respective longitudinal axes. The rollers are arranged relative to the winder axis such that the first and second ends of each roller are offset with respect to one another as viewed from the first end of the respective roller along a line parallel to the winder axis and passing through the longitudinal axis of the respective roller at the first end of the respective roller.

The method for continuously winding a length of moldable material into a helical form according to a preferred embodiment of the present invention includes the steps of continuously feeding a length of moldable material onto a plurality of rollers that are arranged in a substantially cylindrical manner about a winder axis so that the outer surfaces of the rollers define a cylindrical winder surface about which the length of moldable material is to be wound, and individually driving the rollers about respective axes that are non-parallel to the winder axis to thereby cause the length of moldable material to be automatically wound in a helical manner about the winder surface and to continuously move along the length of the rollers.

In accordance with another aspect of the present invention, the winding apparatus can also include an arrangement for cooling the length of material while it is being wound on the rollers. The cooling arrangement can take the form of at least one spray nozzle that discharges a fluid over the exterior surface of the material to be cooled. A baffle and at least one drip fin can also be provided to help ensure that the cooling fluid contacts the material only after the material has moved a predetermined distance along the length of the winder surface.

In one particularly preferred embodiment, the rollers of the present invention can have an outer diameter that is different at at least two points along the length thereof, thereby effectively changing the surface speed of the winding apparatus along its length.

BRIEF DESCRIPTION OF THE DRAWING FIGURES

The features of the apparatus and method according to the present invention will become more apparent from the description that follows, considered in conjunction with the drawing figures in which like elements are designated with like reference numerals and wherein:

FIG. 1 is a diagrammatic side view of the apparatus according to the preferred embodiment of the present invention;

FIG. 2 left end view of the apparatus shown in FIG. 1;

DETAILED DESCRIPTION OF THE PREFERRED EMBODIMENTS

The apparatus according to the present invention for continuously winding a length of material, such as plastic tubing, into a helical form will be described with reference to the accompanying drawing figures. By the term continuously, it is meant that the apparatus of the present invention is able to produce helical windings of material that are not limited in length to the axial length of the generally cylindrical surface about which they are wound. The term is meant to encompass apparatus that are able to operate for as long as desired or until it becomes otherwise necessary to cease operation of the apparatus (e.g. for maintenance purposes or at the end of a work shift, etc.).

Figure 1:
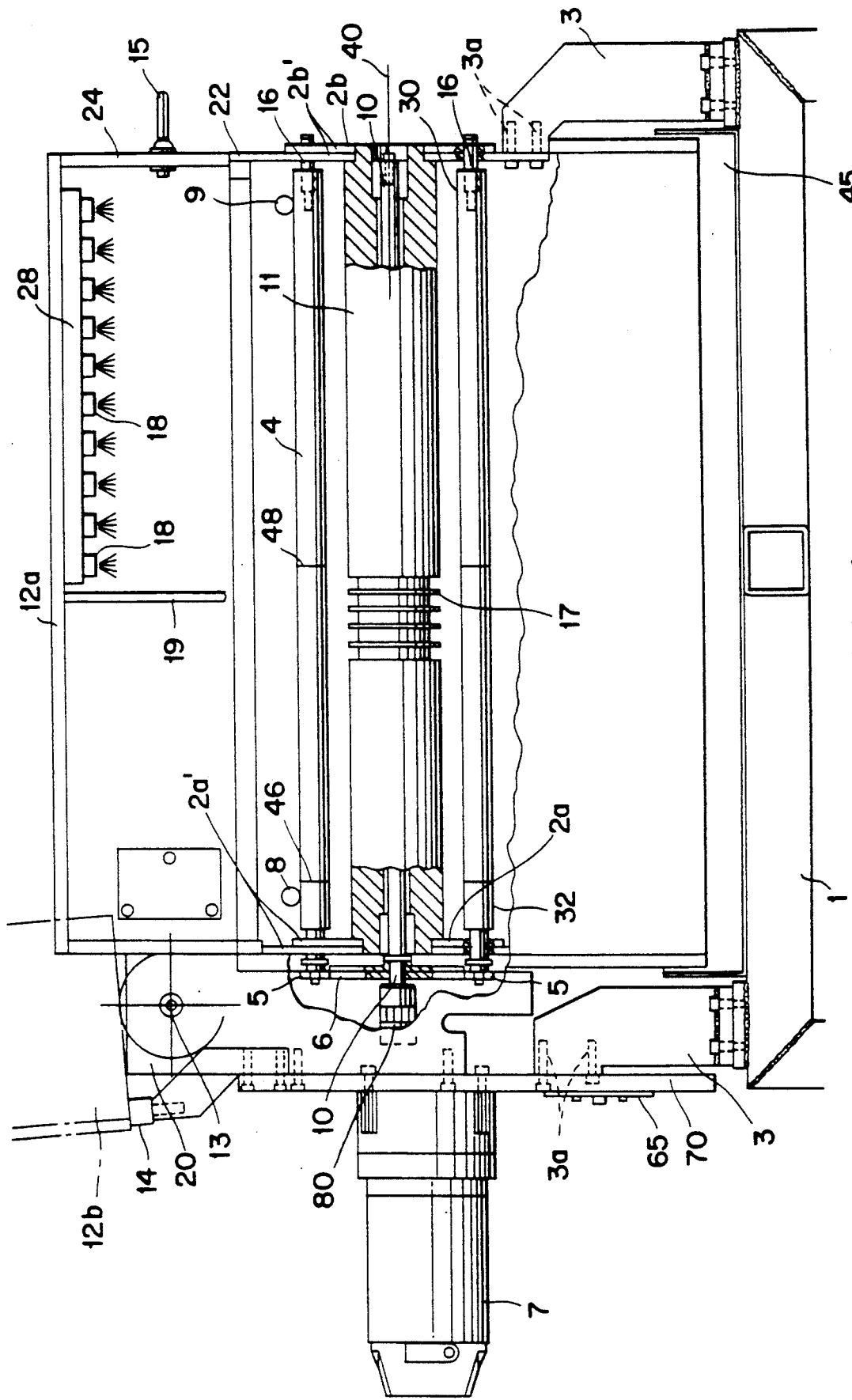

The apparatus according to one embodiment of the present invention includes, as seen initially in FIG. 1, a base plate 1 to which is fixedly connected two end plate members 2a and 2b. The end plate members 2a, 2b can be positioned generally parallel to one other and can include a leading end plate member 2a and a terminal end plate member 2b.

Each of the end plate members 2a, 2b can be comprised of several plate members 2a', 2b' arranged adjacent to one another. The apparatus can be provided with two support arms 3 mounted on either side of the base plate 1. One of the support arms 3 can be connected to the terminal end plate member 2b while the other support arm is connected to a side plate support 70. The base plate 1 can itself be fixed in place or can be mounted on a movable frame to permit the entire apparatus to be readily moved from place to place.

Figure 5:
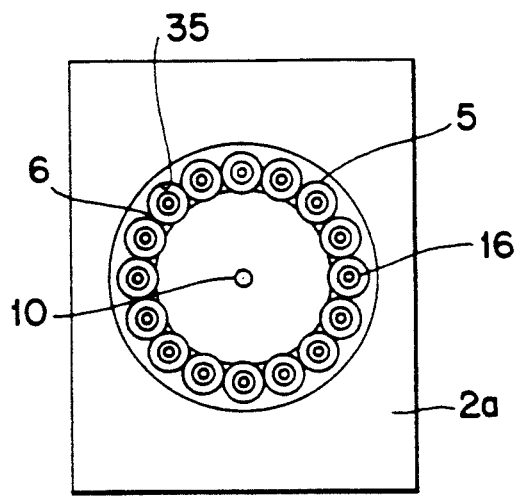
FIG. 5 is an end view of a portion of the apparatus shown in FIG. 1, illustrating the manner in which the central drive gear engages the smaller planetary gears of the rollers.

Each of the end plate members 2a, 2b has a series of holes or sockets 35 (see FIGS. 3 and 5) provided therein. Preferably, the holes or sockets 35 in each end plate member 2a, 2b are arranged in a substantially circular fashion and adjacent holes on each end plate member 2a, 2b are equally spaced from one another. The holes or sockets 35 on each end plate member 2a, 2b are arranged around a common central axis and are spaced equal distances from the common axis.

Figure 3:
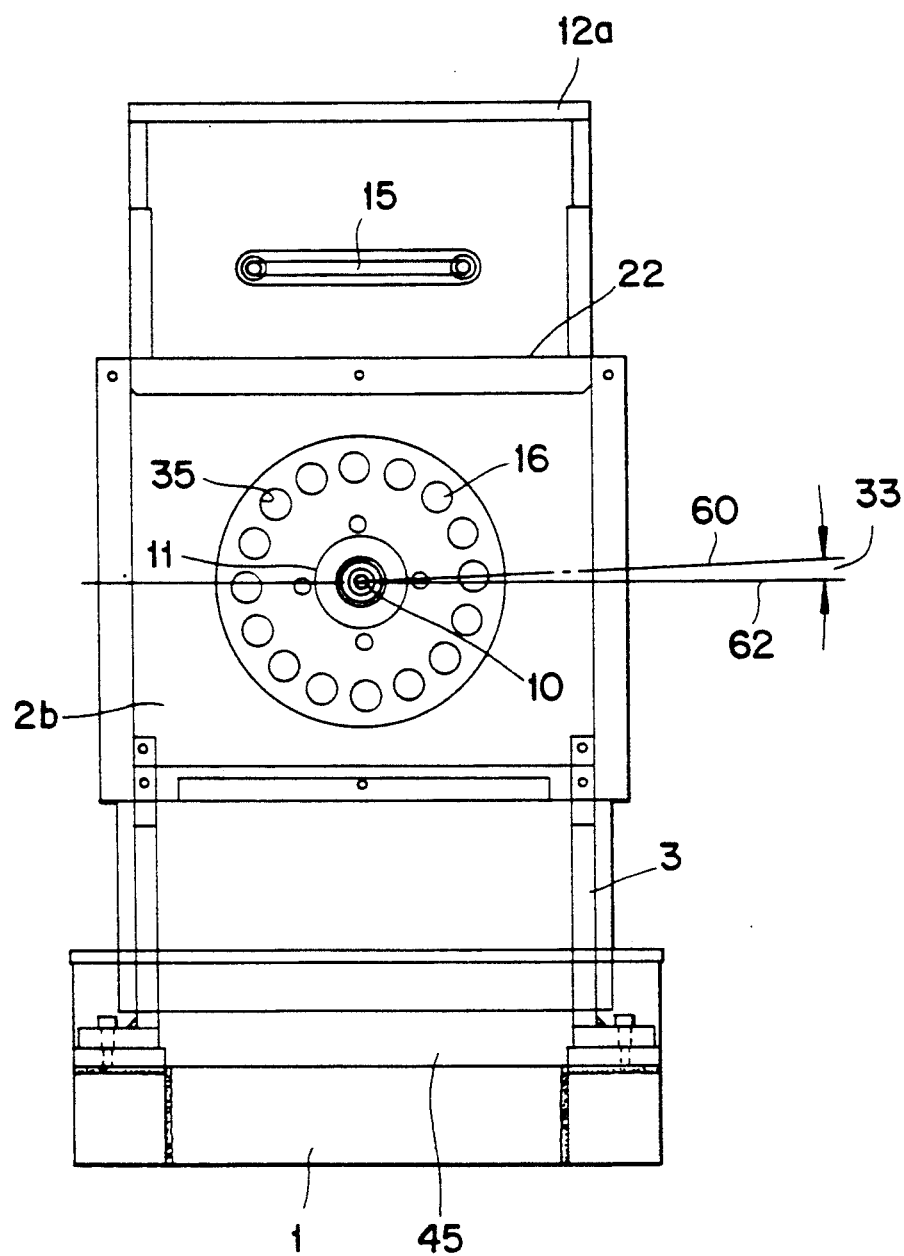
FIG. 3 is a right end view of the apparatus shown in FIG. 1.

The holes 35 in the end plate members 2a, 2b are arranged such that each hole in one of the end plate members 2a has a corresponding hole in the oppositely positioned end plate member 2b. The corresponding holes in the oppositely positioned end plate members 2a, 2b are angularly offset with respect to one another by an angle $\phi$ which is referred to as the offset angle 33. This offset angle 33 is illustrated in FIG. 3 where an axis passing through the centers of two oppositely positioned holes 35 on the terminal end plate member 2b is represented by reference numeral 60 while an axis passing through the corresponding holes in the leading end plate member 2a is represented by reference numeral 62.

The offset angle $\phi$ between corresponding holes in the end plate members 2a, 2b can be varied for purposes that will become apparent later by providing the end plate members 2a, 2b and the mounting arms 3 with any suitable structure that would permit at least one of the end plate members 2a, 2b to be rotated with respect to the other end plate member as well as with respect to the respective mounting arms 3. For example, the terminal end plate member 2b could be provided with circular grooves through which pass the connecting bolts 3a or other suitable connecting device that connect the terminal end plate member 2b to the respective mounting arm 3. Upon loosening of the connecting bolts 3a or other suitable connecting device, the terminal end plate member 2b can then be rotated relative to the mounting arm 3 and the leading end plate member 2a to thereby adjust the offset angle $\phi$.

A plurality of rollers 4 extend between the oppositely positioned end plate members 2a, 2b Each of the rollers 4 has a roller shaft 16 extending from each end thereof for mounting the rollers 4 on the end plate members, 2a, 2b. The rollers 4 are preferably non-grooved to facilitate free movement of material along the length of the rollers 4. Each roller 4 is positioned between the end plate members 2a, 2b such that the roller shafts 16 at opposite ends of each roller 4 are mounted in corresponding sockets 35 in the oppositely positioned end plate members 2a, 2b. It can be readily appreciated, therefore, that in view of the manner in which the rollers 4 are mounted on the end plate members 2a, 2b, only one of the end plate members 2a, 2b need be fixedly mounted on the base plate 1. That is, the mounting arm 3 that is connected to the terminal end plate member 2b could be removed, thereby resulting in a cantilevered type of mounting. In such a case, it may be desirable to include a support for supporting the weight of the rollers 4. This support can take the form of the shell 11 shown in FIG. 1 which is described in more detail below.

The roller shafts 16 can be mounted in spherical bronze bearings (not shown) which are frictionally retained in the sockets 35. The bearings may be positioned between the two plates 2a', 2b' defining the end plate members 2a, 2b.

The maximum angle $\phi$ at which corresponding holes in the end plate members 2a, 2b can be offset relative to one another is limited by the interference of the rollers 4 at the center point along their axes. The maximum angle $\phi$ is dependent upon the roller length, the outer diameter of the winding surface and the diameter of the rollers 4. The roller shafts 16 should be mounted in the aforementioned bearings in a manner that allows a small amount of longitudinal play in the rollers 4. In this way, variations in the offset angle $\phi$ can be effected without adversely affecting the operation of the apparatus.

The rollers 4 are preferably arranged around a winder axis 40 which extends between the two end plates 2a, 2b and which is perpendicular thereto. In practice, the winder axis 40 represents the longitudinal axis about which the moldable material is helically wound. The rollers 4 are arranged in a generally circular manner about the winder axis 40 so that the outer surfaces of the rollers 4 define a substantially cylindrical winder surface about which the length of moldable material can be wound. The radial distance between the winder axis 40 and the longitudinal axis of each of the various rollers 4 is substantially equal.

The material from which the rollers 4 are manufactured can vary, although the material should possess sufficient load bearing capacity. Stainless steel (316 stainless shell) has been found to be a useful material, but other materials could be employed. Also, TEFLON TM covered rollers can provide certain advantages. In some applications, properties such as the material's coefficient of friction, high and low temperature properties, electrical and thermal conductivity, wear resistance, corrosion resistance and stiffness may play a part in selecting a suitable material.

Figure 4:
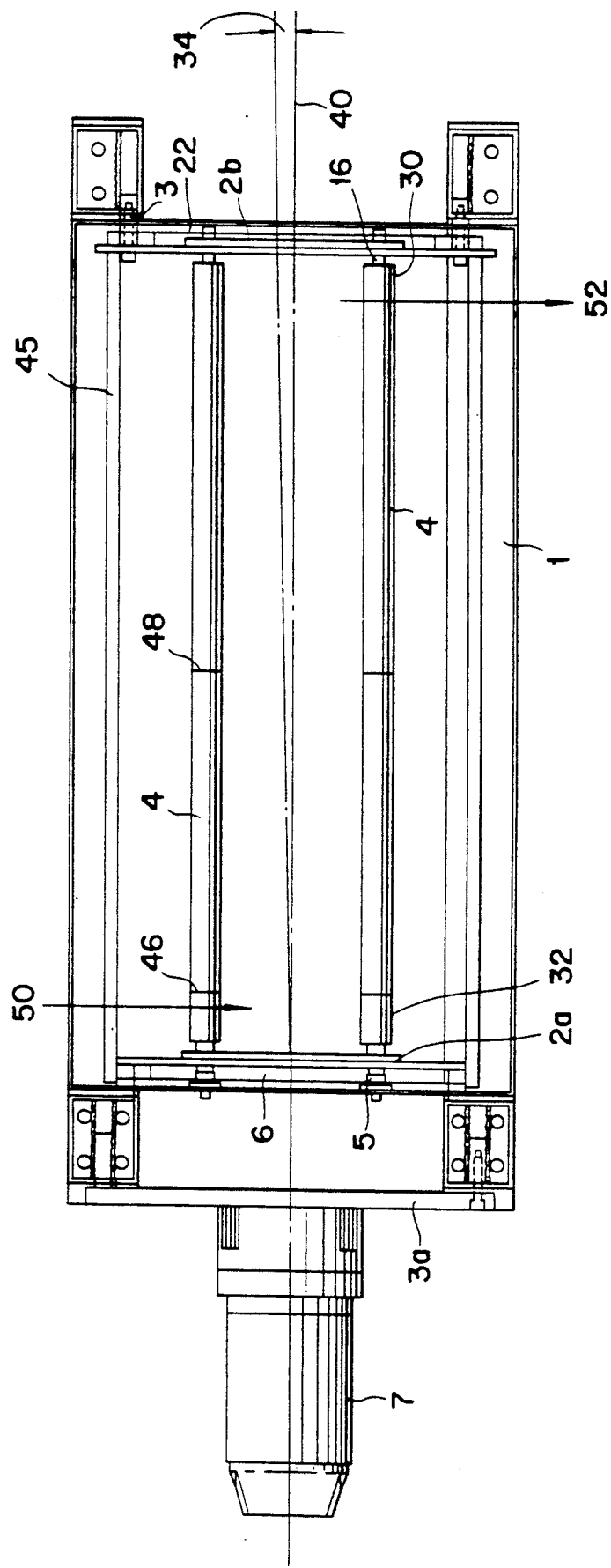
FIG. 4 is a top view of the apparatus shown in FIG. 1 with the hood and cooling means removed therefrom and with only two of the rollers illustrated.

As a result of the aforementioned offset angle $\phi$ between the corresponding sockets 35 in the oppositely positioned end plate members 2a, 2b and the fact that the roller shaft 16 of each roller 4 is mounted in corresponding sockets 35 in the end plate members 2a, 2b, the rollers 4 are positioned at an angle $\theta$ with respect to the winder axis, which angle is called the roller angle 34. The roller angle $\theta$ is illustrated in FIG. 4.

It can be readily seen that the longitudinal axes of the rollers 4 are positioned with respect to the winder axis such that there exists no plane which contains the winder axis and the longitudinal axis of each of the rollers 4. That is, the longitudinal axis of any one of the rollers 4 is not parallel to the winder axis. Stated in another way, the rollers 4 are positioned with respect to the winder axis such that a first plane containing the winder axis and intersecting the longitudinal axis of one of the rollers 4, and a second plane containing the longitudinal axis of that same roller 4 and intersecting the winder axis represent two different planes that are not coplanar with respect to one another. Stated still differently, the entry end 32 of each roller is circumferentially offset with respect to its respective exit end 30 as viewed from one end of the roller along a line parallel to the winder axis 40 and passing through the longitudinal axis of the respective roller at the one end of the respective roller. Stated in another way, the first and second ends of each roller are positioned such that a line coplanar with the winder axis and passing through the first end of the roller at its longitudinal axis will not also pass through the second end of the roller at its longitudinal axis.

The length and diameter of the rollers 4 can be selected to suit the needs of a particular application. There are, however, considerations that affect the choice of a roller length and diameter. To achieve a desired index per revolution of the tubing around the winder surface, a particular roller angle 34 is required and this roller angle 34 varies in dependence upon the diameter of the winder surface (i.e., the diameter defined by the outer surfaces of the rollers 4). The diameter of the winder surface, the index per revolution and the roller angle can be used to geometrically calculate the maximum allowable diameter for a given length of the rollers 4.

The length selected for the rollers 4 may also depend upon the size (i.e., diameter) of the material being helically wound as well as the speed of the rollers 4. If the material being wound is large and/or if the speed of the rollers 4 is relatively fast, longer rollers 4 will be required to ensure that the material is on the winder surface for a time sufficient to impart a helical curvature to the material and effect proper cooling.

To rotatably drive each of the rollers 4, the end of each roller shaft 16 can be provided with a planetary gear 5 that meshes with a central drive gear 6. The central drive gear 6 is fixedly connected to a drive shaft 10 so that upon rotation of the drive shaft 10, the central drive gear 6 will also rotate. Moreover, rotation of the central drive gear 6 results in simultaneous rotation of the planetary gears 5, thereby resulting in the rotation of each of the rollers 4 about their respective longitudinal axes.

All of the rollers 4 rotate in the same direction and each of the rollers 4 can be driven at substantially the same angular speed to provide a moving surface upon which the moldable material can ride during operation of the apparatus. It is preferred, however, that the surface speed of the first roller contacted by the material being wound is substantially equal to the line speed of the material as it is being fed onto the winder (i.e., the rollers 4). Otherwise, stretching of the material may result and in certain applications, such stretching may be undesirable.

Although the rollers 4 can be driven at any suitable speed, there is an upper limit at which the centrifugal force caused by the material's rotation about the winder axis will tend to lift the material off the winder surface. The possibility of the material lifting off the winder surface is proportional to the angular speed of the material around the winder.

The driving arrangement for driving the drive shaft 10 can be in the form of a gear reduced DC drive motor 7 with a ten turn pot speed control. A coupling 80 can be provided to couple the motor shaft to the drive shaft 10. The drive shaft 10 extends interiorly of the cylindrical arrangement of rollers 4 and extends substantially coaxially with the winder axis 40. A shell 11 surrounds the drive shaft 10 and is preferably connected to both end plates 2a and 2b by suitable means. In FIG. 4, the shell 11 and the drive shaft 10 are not shown for purposes of simplifying the drawing figure. As noted above, the shell 11 can serve as a load bearing support arm in a cantilever arrangement in which one of the brackets 3 is removed.

The outer surface of the shell 11 can be provided with a plurality of drip fins 17 whose purpose will become apparent from the description below. The drip fins 17 can be formed by machining a plurality of circumferentially extending grooves or channels into the outer peripheral surface of the shell 11.

As further illustrated in FIG. 1, the apparatus also includes a hood 12a which overlies the rollers 4. The hood 12a is preferably pivotally mounted on a frame part 20 of the apparatus so that it can pivot about an axis 13 from the substantially horizontal position illustrated in full line configuration in FIG. 1 to the dotted line configuration also illustrated in FIG. 1.

When in the horizontal position, the end 24 of the hood 12a located distally from the pivot axis 13 rests on and is supported by an upstanding frame part 22 of the apparatus. The hood 12a is free to pivot up to and just past the vertical position (see the dotted line position of the hood designated 12b in FIG. 1) at which point it stops and rests upon the vertically arranged hood supports 14. The hood supports 14 can be connected to the frame of the apparatus in any suitable manner. A handle 15 can also be provided at one end 24 of the hood 12a for facilitating the pivoting movement of the hood 12a.

The winder apparatus according to the present invention can be used to helically wind material that is heated prior to being fed onto the winder surface (e.g., plastic tubing). By heating the material, it may be easier to impart a helical configuration to the material. In such cases, it may be desirable to cool the material once it has been imparted with a helical curvature. For this reason, the apparatus can also be provided with a cooling arrangement for cooling the helically wound length of material after the material has traversed along the winder surface to a particular point.

In the preferred embodiment, the cooling arrangement includes a plurality of spray nozzles 18 which extend from a spray manifold 28. The spray manifold 28 can be connected in any suitable manner to the inner surface of the hood 12a so that the spray nozzles 18 are positioned above the winder surface. By mounting the spray nozzles 18 on the pivotally mounted hood 12a, it is possible to move the nozzles 18 out of the way in order to access the rest of the apparatus. If desired, the hood 12a could be deleted and the spray nozzles 18 could be mounted elsewhere on the apparatus.

Preferably, the nozzles 18 extend over only a portion of the longitudinal extent of the rollers 4 for reasons that will become apparent from the description that follows.

Each of the nozzles 18 is connected to a supply of fluid for cooling the length of moldable material wound on the rollers 4. The nozzles 18 should preferably be capable of providing a fan spray across a portion of the rollers 4. The cooling fluid is preferably water, although fluids other than water which are capable of providing the necessary cooling function can also be utilized.

The nozzles 18 extend from the exit end 30 of the rollers 4 towards the entry end 32 of the rollers 4. The entry end 32 of the rollers 4 refers to the end of the rollers 4 at which the material enters the apparatus and is initially wound onto the rollers 4 while the exit end 30 of the rollers 4 refers to the end of the rollers where the material is wound off the rollers 4 and exits the apparatus after the helical winding of the material is completed. The nozzles 18 are spaced from the entry ends 32 of the rollers 4 to thereby allow the material to be wound on the winder surface for a sufficient distance before being subjected to the cooling action of the cooling arrangement.

To help ensure that the cooling fluid does not contact the moldable material until the material has moved along the length of the winder surface 4 for a particular distance, a spray baffle 19 is provided. The spray baffle 19 can be connected to the inner surface of the hood 12a and can extend downwardly therefrom a sufficient distance to ensure that fluid or mist discharged from the spray nozzles 18 does not extend beyond a particular point. The baffle 19 is positioned between the entry end 32 of the rollers 4 and the spray nozzles 18.

The drip fins 17 formed on the outer peripheral surface of the shell 11 also contribute to helping prevent the cooling fluid from contacting the helically wound moldable material until it has passed along the rollers 4 for a particular distance. Some of the cooling fluid discharged from the spray nozzles 18 will fall between the spaces between adjacent rollers 4 and may be deposited on the shell 11. The drip fins 17 help prevent the cooling fluid from moving along the length of the shell 11 toward the entry ends 32 of the rollers 4 where it might thereafter fall off onto the material being wound and cause premature cooling.

A tray 45 is positioned below the rollers 4 to catch and collect the cooling fluid discharged from the spray nozzle 18. The tray 45 can be connected to the cooling fluid supply source that supplies cooling fluid to the nozzle 18 so that the fluid can be reused. In such a case, it may be necessary to once again cool the fluid to the appropriate cooling temperature.

It is, of course, possible to employ other types of cooling arrangements for cooling the helically wound length of moldable material. For example, the rollers 4 or the centrally located shell 11 could be connected to a fluid source and provided with small holes so that cooling fluid can be sprayed on the helically wound material. In some applications, such as when a small diameter material is being wound and when the line speed of the winder is slow, it may be possible to cool the rollers 4 by simply passing a cooling medium through the rollers 4. In this case, the cooling medium would cause the rollers 4 around which the material is being wound to be slightly cooled, thereby resulting in cooling of the material. Cooling of the material could also be effected by blowing refrigerated air over the surface of the material, or by supplying cold air through use of an air vortex. These alternative types of cooling arrangements would preferably also be limited in length to only a portion of the longitudinal extent of the winder so that cooling of the material begins after the material has traveled a predetermined distance along the winder surface.

It is also contemplated that heat could be applied to the material to help ensure that the material does not prematurely cool. In this regard, the rollers 4 could be and connected to a hot air source and provided with a plurality of small holes so that the hot air impinges upon the material and maintains the material at a desired temperature. Alternatively, a hot fluid could be passed through the rollers 4 so that the outer surface of the rollers 4 is maintained above a predetermined minimum temperature. Heating the material as it traverses the winder can also contribute to reducing variability in the curvature of the material. This heating of the moldable material would preferably be limited in length so that the heating takes place upstream of the cooling arrangement relative to the direction of movement of the material along the winder surface.

The heating or cooling of the material could also be achieved by submerging the appropriate portion of the winder surface in a bath of cooling or heating fluid.

In accordance with the preferred embodiment, the individual rollers 4 are provided with at least one and preferably several small reductions in diameter 46, 48 along their length. The purpose of the small reductions in diameter will become apparent from the description below.

During operation of the apparatus, the description of which will follow, the position of the winder surface remains fixed. That is, the rollers 4, as a whole, do not move axially and remain at a fixed angle $\phi$ with respect to the winder axis 40. Preferably, only the individual rollers 4 experience movement in the form of rotational movement about their respective longitudinal axes. Of course, as noted above, it is possible, during non-operation of the apparatus, to change the offset angle $\phi$ to thereby vary the spacing between adjacent helical wraps of the material on the winder surface.

Figure 2:
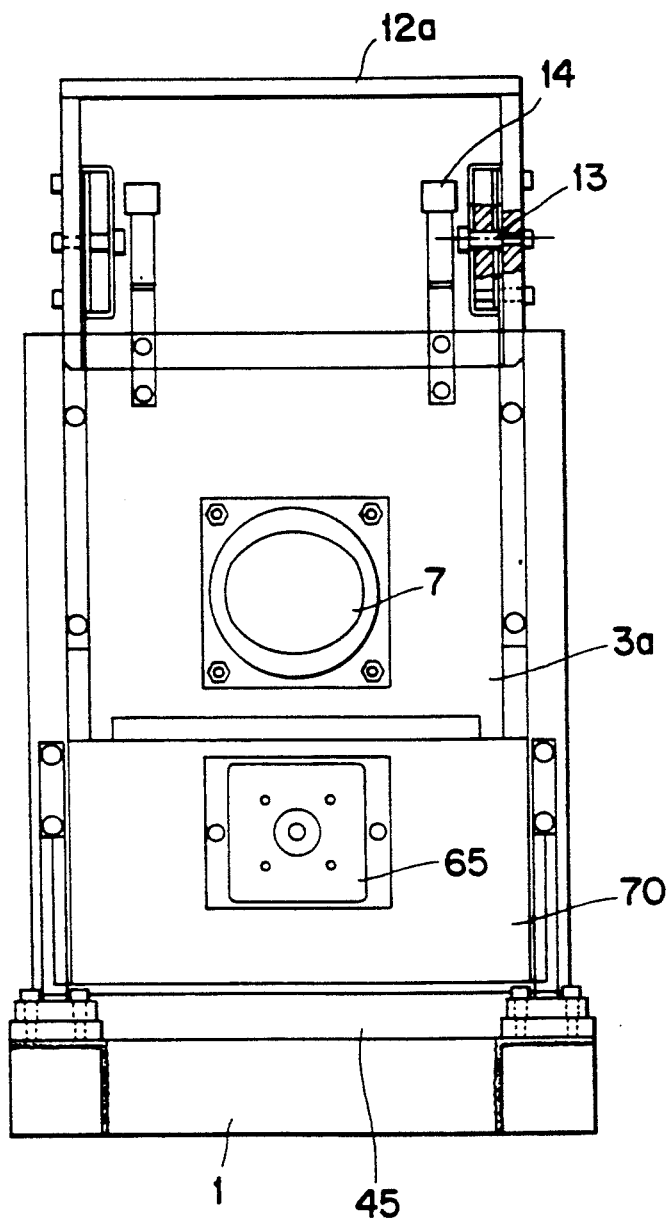

The winder can also be provided with an encoder 65 as seen in FIG. 2 for indicating the line speed of the material in feet per minute.

Figure 8:
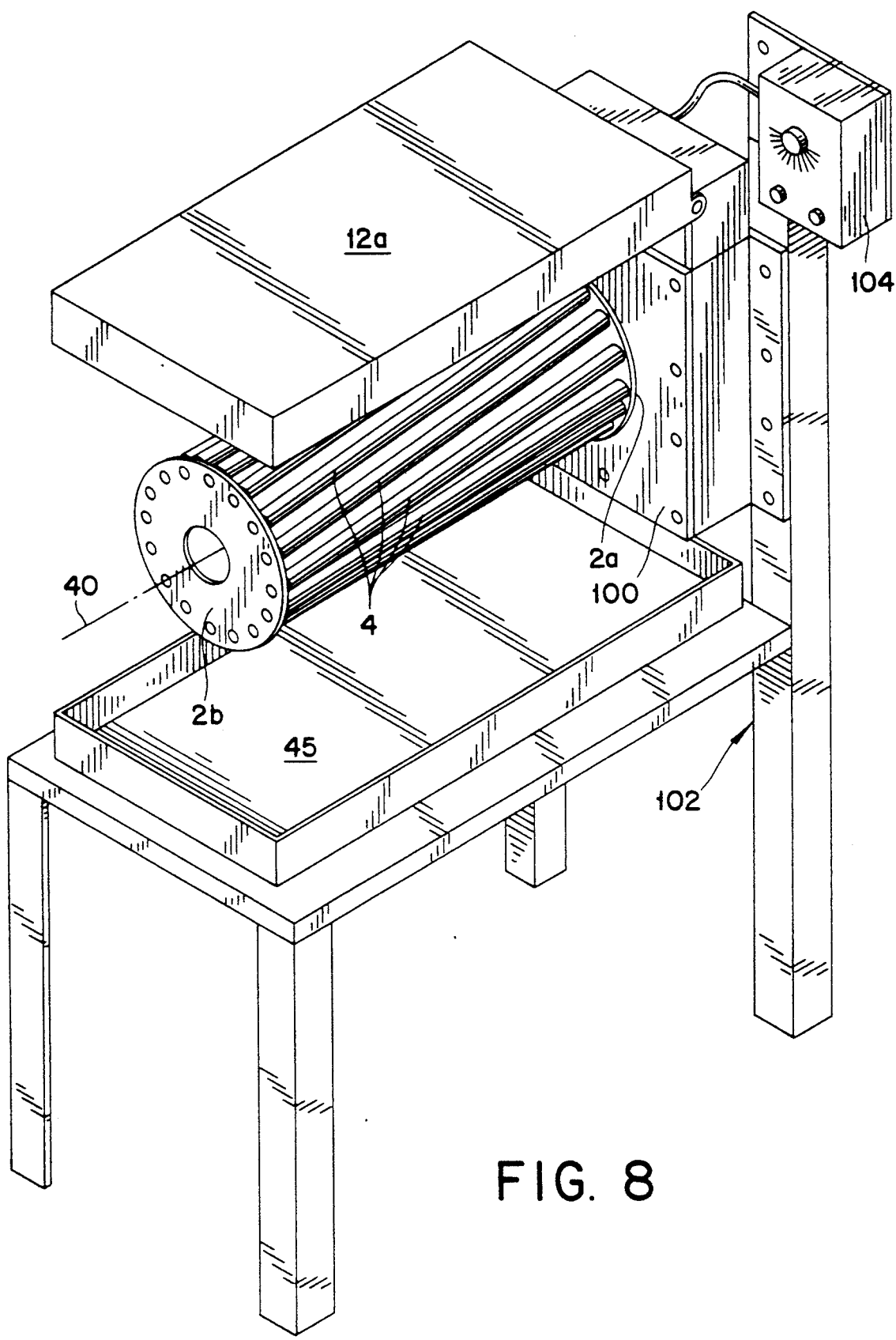
FIG. 8 is a top perspective view of another embodiment of the apparatus according to the present invention.

With reference to FIG. 8, the arrangement of the rollers 4 relative to the winder axis 40 can be more clearly seen. FIG. 8 illustrates a slightly modified form of the apparatus in which the rollers 4 are mounted on the frame structure in a cantilever fashion. The rollers 4 are illustrated as being mounted on a leading end plate member 2a and a terminal end plate member 2b, with the terminal end plate member being fixed to and supported on a housing 100. The housing 100, which encloses the motor and gear arrangements for individually driving the rollers 4, is mounted on a frame structure 102. A control arrangement 104 that is connected to the motor located in the housing 100 can be provided for controlling, for example, the speed of rotation of the rollers 4. A hood 12a which houses the cooling arrangement is positioned in overlying relation to the rollers 4 and a tray 45 is positioned below the rollers 4 to collect fluid resulting from the cooling arrangement.

According to the present invention, there is also provided a method for continuously winding a length of material into a helical form. The method begins by supplying to the winder a continuous length of material (not shown). Under conditions that would apply to the present invention, there are, generally speaking, two mechanisms, which may be responsible for the curvature setting. One factor is the stress relief of the material at elevated temperatures, otherwise referred to as creep. This is the process which contributes to the deformation of thermoplastic materials (e.g. PVC) and metals that are at a temperature which is on the order of approximately half their absolute melting temperature.

Another factor is the plastic deformation associated with stress that exceeds the elastic limit of the material. Some plastics, cold metals and heated metals may be deformed, for example curved, in this manner. Thus, the present invention contemplates the use of many different types of material that can be wound and formed so as to retain a helical configuration. The term "moldable material" encompasses, therefore, a wide range of materials that are capable of being wound into a helical configuration. These materials include, but are not limited to, plastics such as PVC tubing and metals.

In the case of materials, for example, plastics, that are supplied to the winder surface in a heated state, the length of material should achieve a temperature that is high enough for the material to assume and retain the helical shape imparted by the winder unit. For example, PVC tubing may be extruded and cooled in a bath, to a temperature of about 190° F., and thereafter wound directly onto the winder surface using the remaining heat from the extrusion process to aid in the curving process.

Preferably, the length of material is fed onto the rollers 4 in a direction 50 substantially perpendicular to the longitudinal axis of the first roller 4 that is contacted by the material. The material can be fed onto the winder by hand or through use of any suitable feeding arrangement. The approximate point at which the material is fed onto the winding unit is represented by reference numeral 8 in FIG. 1. Likewise, the length of material exits the rollers 4 adjacent the exit end 30 of the rollers 4 in a direction 52 substantially perpendicular to the longitudinal axes of the rollers. The approximate point at which the material leaves the winding unit is represented by reference numeral 9 in FIG. 1.

Small idler rollers (not shown) can be provided to aid in properly feeding the material on the winder surface and to help maintain the position of the material as it is fed on the winder surface. Additionally, the leading portion of the material can be tucked under itself or otherwise secured on the winder surface. The material will then progress along the length of the winder until it reaches the end of the winder surface, at which time the operator can feed the material to the next station (e.g., a cutting station) which provides a light tension to the tubing at the exit end.

The rotation of the individual rollers 4 causes the length of material to advance from one roller to the next. As a result of the relatively perpendicular motion of the roller surface relative to the axes of the rollers 4, the length of material moves in a direction which is also substantially perpendicular to the axes of the rollers 4 and tangent to the outer surfaces of the rollers 4. Quite advantageously, the cross-sectional orientation of the material is maintained relatively constant along the length of the rollers 4 (i.e., the material does not roll or rotate about its own axis as it moves along the winder surface) because the rollers 4 impart substantially no tangential forces to the material.

As the length of material moves from roller to roller it also moves axially along the length of the rollers due to the offset angle $\phi$ of the individual rollers. Thus, the length of material proceeds around the diameter of the winder surface and simultaneously from the leading end to the terminal end of the winder surface. Consequently, the material is wound helically along the winder surface. Since the rollers 4 are positioned at an angle $\theta$ with respect to the winder axis 40, the helical path of the length of material makes an angle $\theta$ with respect to the leading and terminal end plate members 2a, 2b.

Because the material travels about the winder surface at an angle $\theta$, the material indexes a particular distance along the length of the rollers 4 for every wrap the material makes about the winder surface. The index distance is determined for a given diameter of the winder based on the offset angle $\phi$. Thus, the spacing between adjacent helical wraps can be varied by altering the offset angle $\phi$.

Figure 7:
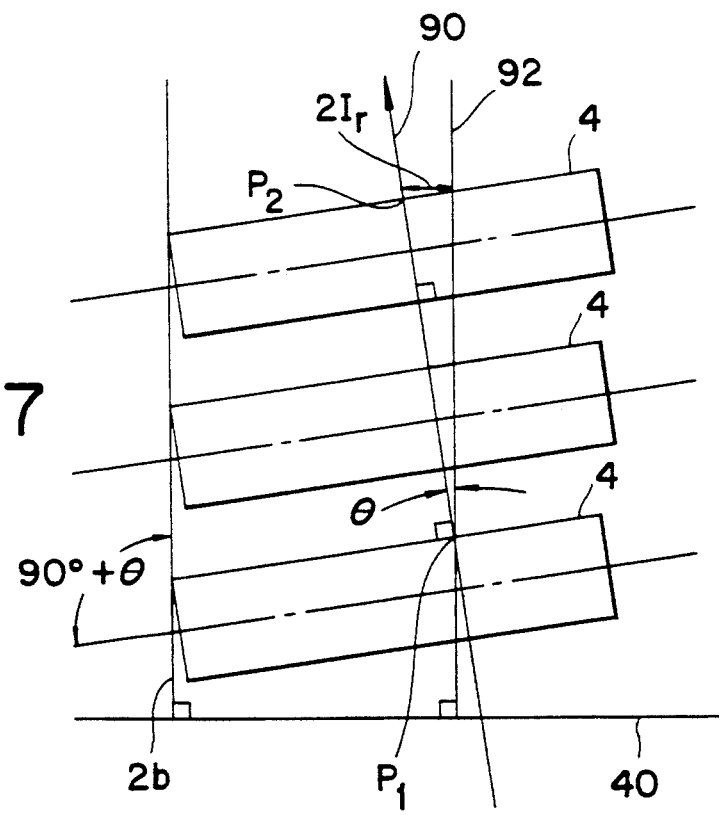
FIG. 7 is a schematic illustration of the arrangement of the rollers relative to the winder axis and the manner in which material moves along the winder surface.

As illustrated schematically in FIG. 7, the direction of travel 90 of the material along the winder surface forms an angle $\theta$, equal to the roller angle, with an axis 92 that is perpendicular to the winder axis 40. Given the fact that the longitudinal axes of the rollers 4 form an angle $\theta$ with respect to the winder axis 40, the tubing travels at an angle $\theta$ with respect to the end plate members 2a, 2b (which are substantially perpendicular to the winder axis 40). For each complete wrap or revolution that the material makes around the winder surface, the material indexes or moves toward the terminal end of the winder surface by a distance $I_R$. Moreover, from one roller to the next, the material indexes a distance $I_r$, such that $I_r = I_{R/n}$, wherein n is the number of rollers 4. Thus, with reference to FIG. 7, material traveling from point $P_1$ to $P_2$ will index a distance equal to $2I_r$ towards the terminal end of the winder surface.

In the case of moldable material, for example, as the moldable material is wound onto the rollers, a tension force is imparted to the material which can tend to cause undesirable flattening of the material. To address this undesirable problem, the rollers 4 can be provided with the aforementioned small reductions in diameter 46, 48 at one or more points along the length of the rollers 4. For example, a first reduction in diameter 46 can be placed at a point along the length of the roller 4 that is spaced approximately the distance of one helical winding from the entry end 32 of the winder surface. The size of this diameter reduction 46 is typically only an amount sufficient to relieve the elastic strain on the moldable material caused by line tension. A second reduction in diameter 48 can also be placed, for example, where the forced cooling of the material begins. One purpose for such a second reduction in diameter is to compensate for the shrinkage of the material caused by cooling. Thus, the size of such a reduction may depend, at least in part, upon the amount of shrinkage which accompanies the cooling of the particular material.

By reducing the diameter of the rollers, there is a direct proportional reduction in the surface speed of each roller and consequently the entire winder surface speed. As a general rule, the percent reduction in surface speed is set by the size of the diameter reduction.

Figure 6:
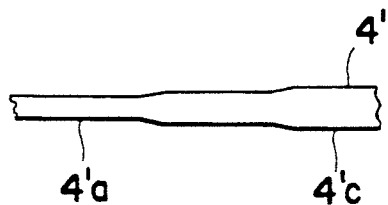
FIG. 6 is a side view of an alternative embodiment of the roller that is employed in the apparatus of the present invention.

When undesirable flattening of the material is not of particular concern or is not a problem, it may be desirable to employ rollers 4' that increase in diameter, as shown by way of example in FIG. 6, from a smaller diameter portion 4'a to a larger diameter portion 4'b. The smaller diameter portion 4'a of the rollers 4' would be positioned at the end of the rollers 4' at which the material is initially fed onto the winder surface while the larger diameter portion 4'b of the rollers 4' would be located at the end of the rollers at which the material is removed from the winder surface.

By increasing the diameter of the rollers 4', the tension on the material can be progressively increased to thereby stretch the material. This may be used at high temperatures to aid in inducing a preferred orientation of the material's crystal structure, such as might be useful within the context of high strength fibers used in composites or high temperature ceramic super-conductors. In certain applications, it may also be desirable and useful to vary the diameter of the entire winder surface. In this way, the diameter of the helical winding will change as it traverses the length of the winder surface. Increasing the diameter of the winder surface from the entry end to the exit end of the winder can aid in the gradual curvature of brittle material at high temperatures to thereby progressively bend the material as it begins to take on a curvature.

The diameter of the helical path is defined by the diameter of the wound material at the point in which the material contacts the rollers. The diameter of the helical path can be varied as desired for the particular use contemplated for the length of material. For example, the apparatus can be constructed to provide a diameter on the order of several inches or several feet. Some adjustments in the helical diameter can be effected by providing radially arranged slots in the plates 2a, 2b in which are mounted the shafts 16 of the rollers 4.

As the material proceeds around the winder surface, the material passes the baffle 19 and is then subjected to a cooling process by way of the cooling fluid dispensed from the spray nozzle 18. It will be noted that the baffle 19 and the nozzle 18 are spaced from the entry end 32 of the rollers 4, thereby ensuring that the material moves in its helical form along the rollers 4 for a predetermined length or to a predetermined point along the rollers 4. Thus, by the time the material reaches the end of the winder surface adjacent the exit ends 30 of the rollers 4 where the material is withdrawn, it has acquired a permanent or inherent curvature determined by the diameter of the winder surface.

By permanent curvature, it is understood that the helical configuration imparted to the material is essentially fixed and cannot be readily altered without reheating or breaking the material. By inherent curvature, it is understood that the material may be bent or contorted by means of an exterior force, but, when the exterior force is removed, the material will return to an essentially helical form having substantially the diameter imparted by the apparatus of the present invention.

When the helically wound material reaches the exit end 30 of the winder surface, it can be readily drawn off by any suitable arrangement or apparatus. For example, a pair of pinch rollers or a belt puller could be provided to achieve a variable and desired tension within a set range of line speeds. If the use of an arrangement for drawing the material off the winder surface might result in the curvature of material being adversely affected (e.g., straightened out), it may be useful to construct the winder apparatus as described above such that the rollers 4 are mounted in a cantilevered manner. With the winder apparatus constructed in that manner, an extension (not shown) can be attached to the exit end of the winder apparatus so that the helically wound material which comes off the end of the winder surface is conveyed onto the extension and hangs from the extension. The extension could take the form of two angled rollers that are oriented in substantially the same manner as the top two rollers 4 on the winder apparatus. These rollers forming the extension could also be driven at the same speed as the rollers 4 on the winder apparatus. Once the material exits the winder surface, the material can be cut into the desired length. It may also be desirable to position a pressure roller at approximately the position represented by reference numeral 9 in FIG. 1 to help prevent the material from becoming loose on the winder surface. The helically wound material can then be subjected to further on-line or off-line operations through suitably integrated and possibly automated systems.

There are various variables associated with a determination of the curvature setting of the moldable material. For example, in the case of plastics, particularly PVC, such a material is viscoelastic. It deforms elastically when initially stressed and then flows viscously with time. The rate at which the material deforms is proportional to applied stress and viscosity, which is in turn a function of temperature. When a piece of hot tubing is bent around a mandrel, stresses are induced in the tubing causing elastic deformation. As the tubing remains under stress on the mandrel, it gradually flows viscously, relieving its internal stresses. As the stresses are relieved, the PVC flows more slowly and will eventually reach equilibrium when all of the stresses are relieved, and the tubing has taken the curvature of the mandrel. Plastic flow, which is permanent non-elastic deformation of the material, will essentially stop by the time the material reaches room temperature, even though there are residual stresses in the material. These stresses are not relieved by plastic flow because the viscosity has risen so high. The residual stresses are relieved by elastic recovery when the material is cut into segments.

In a practical application of curvature setting, it is necessary to determine the minimum hot and cold time required, and the winder diameter required to obtain the desired curvature. This determination can be made according to the following steps: (1) select an arbitrary winder surface diameter which is slightly larger than the radius of curvature desired; (2) select an index distance, i.e., distance traveled along the winder surface per wrap around the winder surface, which provides a comfortable working distance between wraps on the winder surface, and adjust the offset angle $\phi$ of the rollers 4 accordingly; (3) determine the minimum resident time (i.e., the time the material spends on the winder surface) it takes to cool the tubing to approximately room temperature using the cooling arrangement described above; (4) vary the time which the material spends on the winder surface without cooling to determine the resident time over which there is no longer a significant reduction in radius of curvature or standard deviation—this is the minimum hot time; (5) using the minimum hot time determined in (4), vary the cold time around that determined in (3) to calculate the minimum time required for cooling to prevent a loosening of curvature or an increase in standard deviation— this is the minimum cold time; (6) if the radius of curvature obtained via steps (1) through (5) is not that which is desired, then the winder surface diameter can be adjusted accordingly and steps (2) through (5) repeated until the desired curvature is achieved.

For purposes of illustration, some of the parameters that have been found to be useful in designing an apparatus according to the present invention are as follows. Stainless steel rollers approximately 22 inches in length and approximately 0.8 inches in diameter at the entry end 32 have been found to be satisfactory for helically winding clear medical grade PVC tubing having a Shore value of 83–85. The rollers 4 can be provided with two small diameter reductions 46, 48 (See FIG. 1) on the order of approximately 0.004 inches at the places noted above. The apparatus can be provided with an offset angle of about 18° so as to produce a roller angle of approximately 2.5°. index distance between adjacent wraps on the winder unit will be approximately 0.78 inches. The holes in the end plates 2a, 2b can be equally spaced at a diameter of approximately 5.2 inches and sixteen (16) rollers can be employed so as to define a winder surface diameter of approximately 6 inches. The PVC tubing can be wound on the winder unit at a temperature of about 190° F. ± 10° and a line speed of about 20–50 feet/minute. For purposes of cooling, eleven (11) spray nozzles 18 can be provided so that adjacent nozzles are spaced apart approximately one inch center to center. The spray nozzles 18 can be designed to provide an 80° fan spray across the winder unit and the center of the spray nozzle located closest to the exit end 30 of the rollers can be spaced approximately one inch from the exit end 30 of the rollers 4. The spray baffle 19 can be positioned approximately 12.5 inches from the exit end 32 of the rollers 4. Cooling water can be supplied at a pressure of about 15 psi and a temperature of about 40° F. +5° to thereby deliver approximately 1.8 gallons/minute of water to cool the tubing. Based on the foregoing parameters, the temperature of the plastic tubing as it exits the winder unit will be approximately 70° F. ± 10°.

As can be seen from the foregoing figures and description, the apparatus of the present invention advantageously enables the continuous winding of a length of material into a helical form. Once the initial curvature setting parameters are determined and implemented, the apparatus of the present invention does not require human intervention. Thus, the present apparatus advantageously reduces the waste, labor costs and product variability commonly associated with the helical winding of moldable material through use of other known apparatus. Moreover, by providing a method and apparatus for continuously winding a length of material into a helical form, the material can undergo further processing, possibly through automated operation, while still in a continuous form.

Furthermore, the apparatus of the present invention does not require rotation or translation of the winder unit to helically wind the material. Rather, the lateral motion of the material is induced by a winder surface that moves at an angle, thus producing substantially no sliding motion or tangential forces on the material. Thus, the cross-sectional orientation of the material remains substantially constant as the material traverses the winder surface. That is to say, the material does not substantially roll as it moves along the winder surface so that the cross-sectional orientation of the material relative to the winder surface is substantially the same when the material exits the winder surface as when it is first placed on the winder surface. Consequently, the material is produced with minimal damage to the exterior surface.

Also, the feature incorporated into the rollers for reducing the elastic strain on the tubing or other material that is being helically wound (i.e., the small reductions in diameter along the length of the rollers) is advantageous in that damage to the tubing or other material can be reduced and the quality of the resulting product increased.

Due to the relative simplicity of the apparatus, the set-up and operation of the apparatus is rather easy. The inherent ability of the winder unit to evenly space the tubing or other material about the winder surface and the absence of horizontal constraints on the tubing or other material also contributes to the ease with which the apparatus can be set-up and operated. Additionally, the absence of horizontal constraints allows materials with a much wider range of diameters to be wound on the same apparatus. Moreover, inadvertent haphazard wrappings of the tubing or other material will be automatically straightened, thereby maintaining generally even spacing between adjacent helical wraps.

It will be appreciated by the ordinary skilled artisan that the apparatus of the present invention is highly flexible in that a wide range of line speeds, tubing diameters, tubing materials, cooling set-ups, or heating set-ups can be used without detracting from the objects of the present invention.

It will likewise be appreciated that the apparatus can be used for a wide variety of purposes including, but not limited to, continuous curvature setting, cooling, heating, annealing of drawn wire, electroplating of wire or chains, stretching of filamentous materials at high-temperature, in a bath or in a controlled atmosphere, as well as many other continuous forming and treating processes.

The winder according to the present invention could also be used to hold a length of material in one place for a time proportional to the number of wraps, the winder diameter and the line speed. In such a case, the winder could be used to heat treat wire by placing the winder in a furnace as the wire is passing from one drawing die to another. The winder could also be used to assist in chemically treating a material, for example in a bath, as the material is continuously being fabricated or processed. The heat treatment of fine wire could also be achieved by creating an electrical potential between adjacent rollers 4 on the winder, thereby resistively heating the wire. In this regard, the purpose of the winder would be to hold a length of material in a relatively compact space while a treatment process other than or in addition to curvature setting is performed.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced thereby.

What is claimed is:

1. An apparatus for continuously winding a length of tubular material into a helical form, comprising: a base plate; two oppositely positioned end plates, at least one of the end plates being connected to the base plate; a plurality of rollers mounted on and extending between said two end plates, said plurality of rollers being arranged in a substantially circular manner about a winder axis, each of said rollers having a respective longitudinal axis and a non-grooved outer surface over which the tubular material travels, each of said rollers having a first portion whose outer diameter is greater than a second portion; means for individually rotatably driving each of said rollers in the same rotational direction about their respective longitudinal axes, said rollers being arranged with respect to the winder axis such that a first plane containing the winder axis and interseting the longitudinal axis of one of the rollers is different from a second plane containing the longitudinal axis of said one roller and intersecting the winder axis so that tubular material fed onto an outer surface of the rollers is continuously wound into a helical form as the length of tubular material moves along the length of the rollers.

2. The apparatus according to claim 1, wherein an outer diameter of each roller varies at several places along the length thereof.

3. The apparatus according to claim 2, wherein said rollers include first and second oppositely positioned ends, the first ends of the rollers being positioned adjacent the point where the tubular material is fed onto the rollers and the second ends of the rollers being positioned adjacent the point where the tubular material is fed off the rollers, wherein the rollers having an outer diameter that varies possess an outer diameter adjacent the first ends thereof that is greater than the diameter adjacent the second ends thereof, to thereby reduce the elastic strain on the tubular material as the tubular material moves along the length of the rollers.

4. The apparatus according to claim 1, wherein there exists no plane which contains both the winder axis and the longitudinal axis of any one of the rollers.

5. The apparatus according to claim 1, including means for cooling the tubular material after the tubular material has reached a predetermined point along the length of the rollers.

6. The apparatus according to claim 5, including a hood pivotally connected to said base plate and overlying at least a portion of the length of the rollers, said means for cooling includes at least one spray nozzle mounted on said hood and connected to a source of cooling fluid for dispensing a cooling fluid over an exterior surface of the tubular material.

7. The apparatus according to claim 1, wherein said means for rotatably driving said rollers includes a motor having a drive shaft which is operatively associated with a central drive gear, and each roller having a roller shaft connected thereto, the roller shaft of each roller having a planetary gear operatively associated therewith that meshes with the central drive gear so that a rotational driving force imparted to the drive shaft by the motor causes rotation of the rollers by way of the intermeshing central drive gear and the planetary gears.

8. The apparatus according to claim 6, including means for preventing the cooling fluid from contacting the tubular material until the tubular material has reached the predetermined point along the length of the rollers.

9. The apparatus according to claim 8, wherein said rollers include first and second oppositely positioned ends, the first ends of the rollers being positioned adjacent the point where the tubular material is fed onto the rollers and the second ends of the rollers being positioned adjacent the point where the tubular material is fed off the rollers, said means for preventing the cooling fluid from contacting the tubular material until the tubular material has reached the predetermined point along the length of the rollers includes a baffle mounted on said hood at a point between said spray nozzle and the first ends of the rollers.

10. The apparatus according to claim 8, including a shell mounted on said end plates and positioned radially inwardly from said circular arrangement of rollers, said means for preventing the cooling fluid from contacting the tubular material until the tubular material has reached the predetermined point along the length of the rollers includes at least one circumferentially extending groove formed on an outer peripheral surface of the shell.

11. An apparatus for continuously winding a length of tubular material into a helical form, comprising: a frame structure; a plurality of rollers mounted on said frame structure, each of said rollers having a longitudinal axis and oppositely positioned first and second ends, each of said rollers having an outer peripheral surface and said plurality of rollers being arranged about a winder axis in a substantially circular fashion so that the outer surfaces of the rollers define a substantially cylindrical winder surface, said winder surface having an entry end at which tubular material to be helically wound is fed onto the winder surface and an exit end at which helically wound tubular material is directed off the winder surface; a driving mechanism for individually rotatably driving each of the plurality of rollers about their respective longitudinal axes; and means for helically winding the tubular material around the winder surface while the tubular material moves from the entry end of the winder surface to the exit end of the winder surface, and means for maintaining the tubular material in a substantially constant cross-sectional orientation relative to the winder surface as the tubular material moves from the entry end to the exit end of the winder surface so that the tubular material is prevented from rolling and becoming damaged.

12. The apparatus according to claim 11, including means for cooling the tubular material after the tubular material has reached a predetermined point along the winder surface.

13. The apparatus according to claim 11, wherein the portion of each of the rollers over which the tubular material passes has an outer surface that is devoid of grooves, and wherein the means for maintaining the tubular material in a substantially constant cross-sectional orientation relative to the winder surface includes an outer diameter of each of the rollers being different at at least two points along the length thereof.

14. The apparatus according to claim 11, including a plurality of spray nozzles positioned with respect to the rollers so as to extend along less than the entire length of said plurality of rollers, said spray nozzles being connected to a source of cooling fluid so that cooling fluid can be sprayed onto the tubular material wound on the rollers after the tubular material has moved to a predetermined point along the length of the rollers to thereby cool the tubular material.

15. The apparatus according to claim 14, wherein the winder axis is arranged in a non-parallel manner with respect to the longitudinal axes of the rollers.

16. The apparatus according to claim 11, wherein said means for helically winding the tubular material includes the first and second ends of each roller being rotationally offset with respect to one another as viewed from one end of the respective roller along a line parallel to the winder axis and passing through the longitudinal axis of the respective roller at the one end of the respective roller.

* * * * *

UNITED STATES PATENT AND TRADEMARK OFFICE
CERTIFICATE OF CORRECTION

PATENT NO.   : 5,330,345

DATED        : July 19, 1994

INVENTOR(S)  : Christopher W. Strock, Rachel E. Hefner, Shelly Petronis and Rene M. Cooper It is certified that error appears in the above-identified patent and that said Letters Patent is hereby corrected as shown below:

In column 14, line 68:   delete "interseting" and insert therefor --intersecting--.

Signed and Sealed this

Twenty-second Day of November, 1994

Attest:

BRUCE LEHMAN

Attesting Officer

Commissioner of Patents and Trademarks